L. Cutting,
Clothes Drier.
No. 107,763.   Patented Sep. 27, 1870.
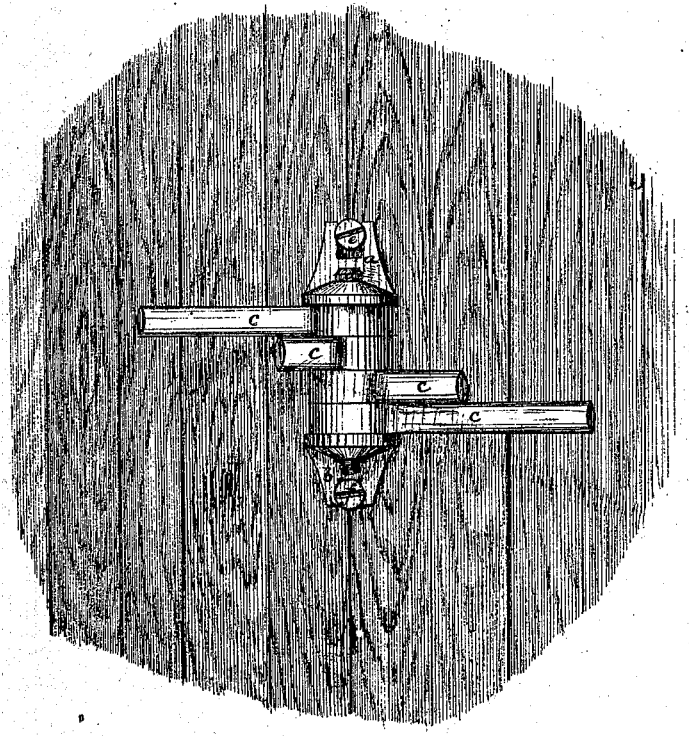
Witnesses: J. B. Crosby, C. Warren Brown    Lewis Cutting

United States Patent Office.

LEWIS CUTTING, OF SAN FRANCISCO, CALIFORNIA.

Letters Patent No. 107,763, dated September 27, 1870.

IMPROVEMENT IN CLOTHES-DRIERS.

The Schedule referred to in these Letters Patent and making part of the same

To all whom it may concern:

Be it known that I, LEWIS CUTTING, of the city and county of San Francisco and State of California, have invented an Improved Clothes-Rack; and I do hereby declare that the following, taken in connection with the drawing which accompanies and forms part of this specification, is a description of my invention sufficient to enable those skilled in the art to practice it.

This invention relates to details of construction of a portable, adjustable rack on which to hang clothing and other articles to be aired or dried, the rack being made so that it can be affixed to any vertical object, and removed therefrom without the use of tools, so that it may be removed from sight when not in use; and The invention consists in making the parts of the rack, by which it is attached to a wall or partition, in pieces separate from each other, each slotted, as hereinafter described, and united by an axis for the rack-bars to swing laterally upon, made as a screw by which the said parts may be drawn together, so as to keep the rack-bars from swinging too freely.

My invention is shown in the accompanying perspective view, in which—

$a$ is is the top, and $b$, the bottom piece, between which the rack-bars $c$ are clamped by the screw-threaded axis $d$.

The pieces $a$ and $b$ are right angular pieces or knees, and are preferably castings.

The piece $a$ has a long slot in the upright arm of the knee, said slot being open at the top. The piece $b$ has a similar but shorter slot in its upright arm, open at the bottom, the hole in the piece $b$ for the axis $d$ being nut-threaded, and the axis hole in the piece $a$ being smooth.

In the object to which the rack is to be attached are fixed two screws or pins $e$ and $f$, and the rack is applied to them by first slipping the slotted piece $a$ over the screw $e$ in an angular direction, and then bringing the rack in a vertical position, and allowing it to slide down so that the slot in $b$ will embrace the screw $f$.

The rack-bars being then moved laterally into any desired position or relation, are clamped by turning the screw-threaded axis $d$, such turning bringing the pieces $a$ and $b$ toward each other, so that however much the rack-bars shrink or wear, they can always be clamped sufficiently to keep them from having a free swinging movement.

I claim—

The described rack, as made, combined with its rack-bars, and having separate pieces $a$ and $b$, with open-ended slots, as set forth, and united with each other by the screw-threaded axis $d$, and nut-threaded piece, so as to clamp the rack-bars at will in any position.

LEWIS CUTTING.

Witnesses:
J. B. CROSBY,
C. WARREN BROWN.